(12) United States Patent
Namgoong et al.

(10) Patent No.: US 8,970,679 B2
(45) Date of Patent: Mar. 3, 2015

(54) THREE DIMENSIONAL CAMERA DEVICE AND METHOD OF CONTROLLING THE SAME

(75) Inventors: Bo Ram Namgoong, Seoul (KR); Hwang Joon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 13/309,957

(22) Filed: Dec. 2, 2011

(65) Prior Publication Data

US 2012/0147146 A1 Jun. 14, 2012

(30) Foreign Application Priority Data

Dec. 10, 2010 (KR) .................. 10-2010-0126057

(51) Int. Cl.
*H04N 13/02* (2006.01)
*H04N 5/228* (2006.01)
*H04N 5/225* (2006.01)
*G03B 17/00* (2006.01)

(52) U.S. Cl.
CPC ....... *H04N 13/0239* (2013.01); *H04N 13/0296* (2013.01); *H04N 2213/001* (2013.01)
USPC ............. 348/47; 348/208.7; 348/335; 396/55

(58) Field of Classification Search
None
See application file for complete search history.

(56) References Cited

U.S. PATENT DOCUMENTS

| | | | | |
|---|---|---|---|---|
| 4,654,872 A | * | 3/1987 | Hisano et al. .................. | 382/154 |
| 5,978,015 A | * | 11/1999 | Ishibashi et al. ................ | 348/47 |
| 6,507,359 B1 | * | 1/2003 | Muramoto et al. ............. | 348/47 |
| 7,196,719 B2 | * | 3/2007 | Koselka et al. ................. | 348/47 |
| 7,307,653 B2 | | 12/2007 | Dutta | |
| 7,397,511 B2 | * | 7/2008 | Ezawa .......................... | 348/373 |
| 7,548,685 B2 | * | 6/2009 | Mashima et al. ............... | 396/53 |
| 7,599,616 B2 | * | 10/2009 | Uchiumi et al. .............. | 396/324 |
| 7,856,180 B2 | * | 12/2010 | Chishima ...................... | 396/324 |
| 7,885,524 B2 | * | 2/2011 | Uenaka ......................... | 396/55 |
| 8,089,519 B2 | * | 1/2012 | Uenaka ...................... | 348/208.7 |
| 8,111,293 B2 | * | 2/2012 | Uenaka ...................... | 348/208.4 |
| 8,194,142 B2 | * | 6/2012 | Uenaka ...................... | 348/208.7 |
| 2001/0014221 A1 | * | 8/2001 | Tomita .......................... | 396/325 |
| 2003/0040346 A1 | * | 2/2003 | Fukuda et al. ................ | 455/575 |
| 2006/0293810 A1 | * | 12/2006 | Nakamoto ..................... | 701/28 |
| 2008/0131107 A1 | * | 6/2008 | Ueno .............................. | 396/50 |
| 2008/0239064 A1 | * | 10/2008 | Iwasaki .......................... | 348/47 |
| 2008/0239135 A1 | * | 10/2008 | Tamura ......................... | 348/335 |
| 2010/0165130 A1 | * | 7/2010 | Uenaka ...................... | 348/208.7 |
| 2010/0177167 A1 | * | 7/2010 | Hu ................................. | 348/47 |
| 2010/0194860 A1 | * | 8/2010 | Mentz et al. .................... | 348/47 |
| 2011/0234765 A1 | * | 9/2011 | Tanaka ............................ | 348/47 |
| 2011/0234766 A1 | * | 9/2011 | Hashimoto ..................... | 348/47 |
| 2011/0280564 A1 | * | 11/2011 | Ikeda ............................ | 396/324 |
| 2012/0062707 A1 | * | 3/2012 | Seo et al. ........................ | 348/47 |

FOREIGN PATENT DOCUMENTS

KR 10-0830502 B1 5/2008

* cited by examiner

*Primary Examiner* — Christopher S Kelley
*Assistant Examiner* — Mohammed Jebari
(74) *Attorney, Agent, or Firm* — Jefferson IP Law, LLP

(57) ABSTRACT

A three dimensional camera device and a method of controlling the same are provided. The three dimensional camera device and the method enable a user to photograph a three dimensional image suitable for a photographing angle. Since a swing hinge rotates a left camera element and a right camera element about a mid-point between the left camera element and the right camera element, a user may photograph a three dimensional image suitable for a photographing angle.

16 Claims, 24 Drawing Sheets

THREE DIMENSIONAL CAMERA DEVICE AND METHOD OF CONTROLLING THE SAME

PRIORITY

This application claims the benefit under 35 U.S.C. §119(a) of a Korean patent application filed on Dec. 10, 2010 in the Korean Intellectual Property Office and assigned Serial No. 10-2010-0126057, the entire disclosure of which is hereby incorporated by reference.

BACKGROUND OF THE INVENTION

1. Field of the Invention

The present invention relates generally to a three dimensional camera device and a method of controlling the same. More particularly, the present invention relates to a three dimensional camera for enabling three dimensional photographing suitable for a photographing angle of a user and a method of controlling the same.

2. Description of the Related Art

Recently, demand for three dimensional photographs and moving pictures that give a user a three dimensional experience has increased. In order to satisfy the demand, a large number of three dimensional camera devices capable of performing three dimensional photographing are being manufactured.

The three dimensional camera device according to the related art will be described below with reference to FIGS. 1A through 2B.

FIG. 1A is a view illustrating a 'normal landscape pose' of a three-dimensional camera device according to the related art; and FIG. 1B is a three-dimensional image captured in the 'normal landscape pose' and displayed on a display of the three-dimensional camera of FIG. 1A. FIG. 2A is a view illustrating a 'portrait pose' of a three dimensional camera device according to the related art; and FIG. 2B is a three-dimensional image captured in the 'portrait pose' and displayed on a display of the three-dimensional camera of FIG. 2A.

For reference, in the three dimensional camera device of the related art, the term 'normal landscape pose' denotes an orientation of a pose of the three dimensional camera device of the related art in which a three dimensional image is normally displayed on a display unit. The 'portrait pose' in FIGS. 2A and 2B are rotated by 90 degrees from the normal landscape pose in FIGS. 1A and 1B.

Referring to FIGS. 1A through 2B, the three dimensional camera device 100 includes a left camera element 110 and a right camera element 120 which are provided at the front side of the three dimensional camera device 100, and a display unit 140 provided at the rear side of the three dimensional camera device 100. The left camera element 110 is a device photographing an image for a left eye 141 of a subject 180 while the right camera element 120 is a device photographing an image for a right eye 142 of the subject 180. The display unit 140 displays the image for a left eye 141 and the image for a right eye 142 to display a three dimensional image for a user 190.

According to the three dimensional camera device 100 of the related art, when the three dimensional camera device of the related art is used with the normal landscape pose as illustrated in FIG. 1A, since the left camera element 110 and the right camera element 120 are arrange horizontally, a three dimensional image of the subject 180 is normally photographed. In this case, since the image for a left eye 141 and the image for a right eye 142, as illustrated in FIG. 1B, are arranged and displayed horizontally on the display unit 140, the user may see the three dimensional image normally. However, in a case where the three dimensional camera device 100 is in the portrait pose (i.e., rotated by 90 degrees from the normal landscape pose) as illustrated in FIG. 2A, since the left camera element 110 and the right camera element 120 are arranged vertically, the image for a left eye 141 and the image for a right eye 142 are arranged and displayed vertically on the display unit 140 as illustrated in FIG. 2B.

Thus, since the left camera element and the right camera element are fixed in the three dimensional camera device of the related art, the three dimensional camera device of the related art cannot photograph a subject normally when the three dimensional camera device of the related art is used at a pose that is not the normal landscape pose.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a three dimensional camera device for photographing a three dimensional image suitable for a photographing angle of a user.

In accordance with an aspect of the present invention, a three dimensional camera device is provided. The three dimensional camera device comprises a left camera element, a right camera element, and a swing hinge for rotating the left camera element and the right camera element about the mid-point between the left camera element and the right camera element.

In accordance with an aspect of the present invention, a method of controlling a three dimensional camera device is provided. The method comprises rotating a swing hinge, which rotates a left camera element and a right camera element about a mid-point between the left camera element and the right camera element, such that a transversal direction of the swing hinge is a horizontal direction; and rotating the left camera element and the right camera element such that a reference direction of the left camera element and a reference direction of the right camera element are aligned with a reference direction of the three dimensional camera device.

According to aspects of the present invention, a swing hinge, which rotates a left camera element and a right camera element about a mid-point between the left camera element and the right camera element, is provided in a three dimensional camera device, so that a user may photograph a three dimensional image suitable for a photographing angle of the user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A three dimensional camera device according to an exemplary embodiment of the present invention will be described below with reference to FIGS. 3A to 5.

Figure 1A:
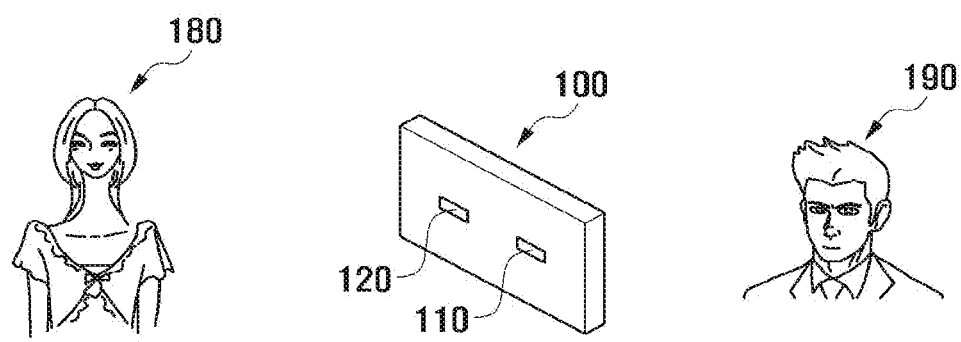
FIG. 1A is a view illustrating a 'normal landscape pose' of a three-dimensional camera device according to the related art.
Figure 1B:
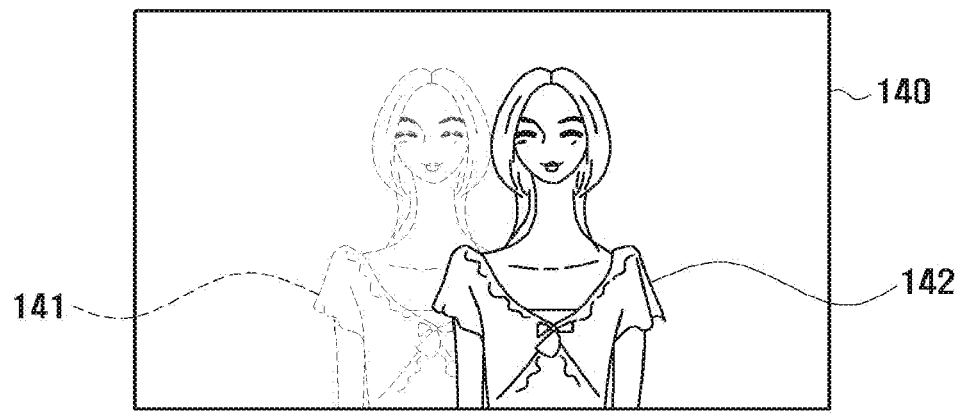
FIG. 1B is a three-dimensional image captured in the 'normal landscape pose' and displayed on a display of the three-dimensional camera of FIG. 1A.
Figure 2A:
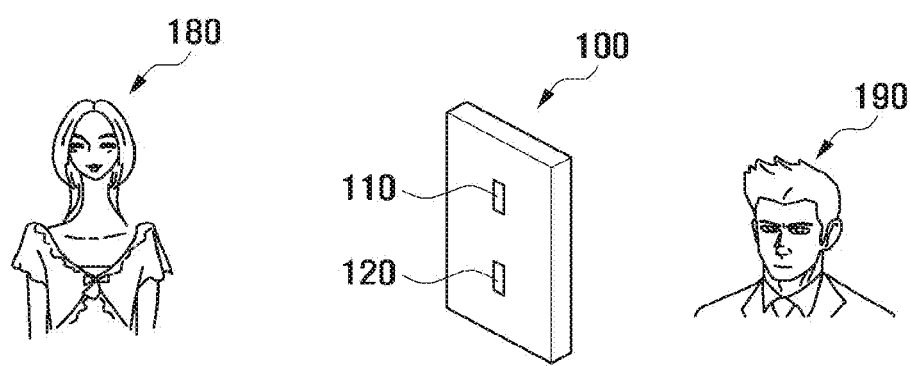
FIG. 2A is a view illustrating a 'portrait pose' of a three dimensional camera device according to the related art.
Figure 2B:
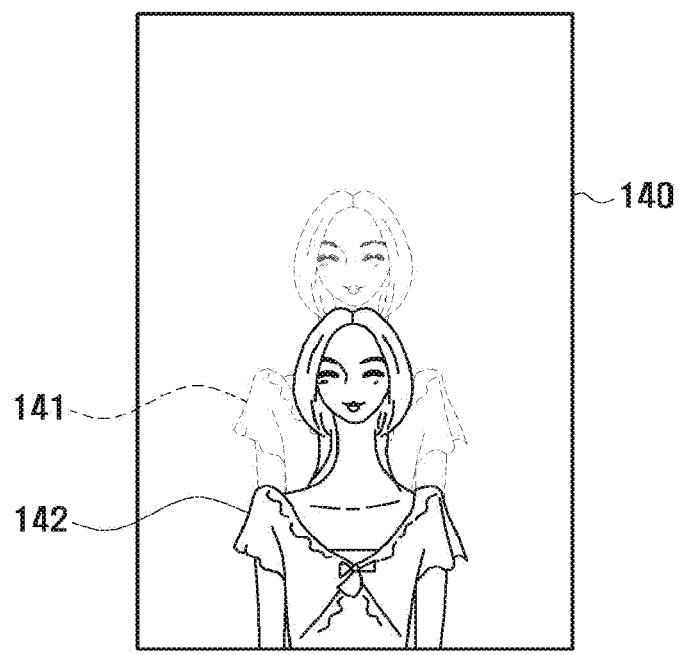
FIG. 2B is a three-dimensional image captured in the 'portrait pose' and displayed on a display of the three-dimensional camera of FIG. 2A.
Figure 3A:
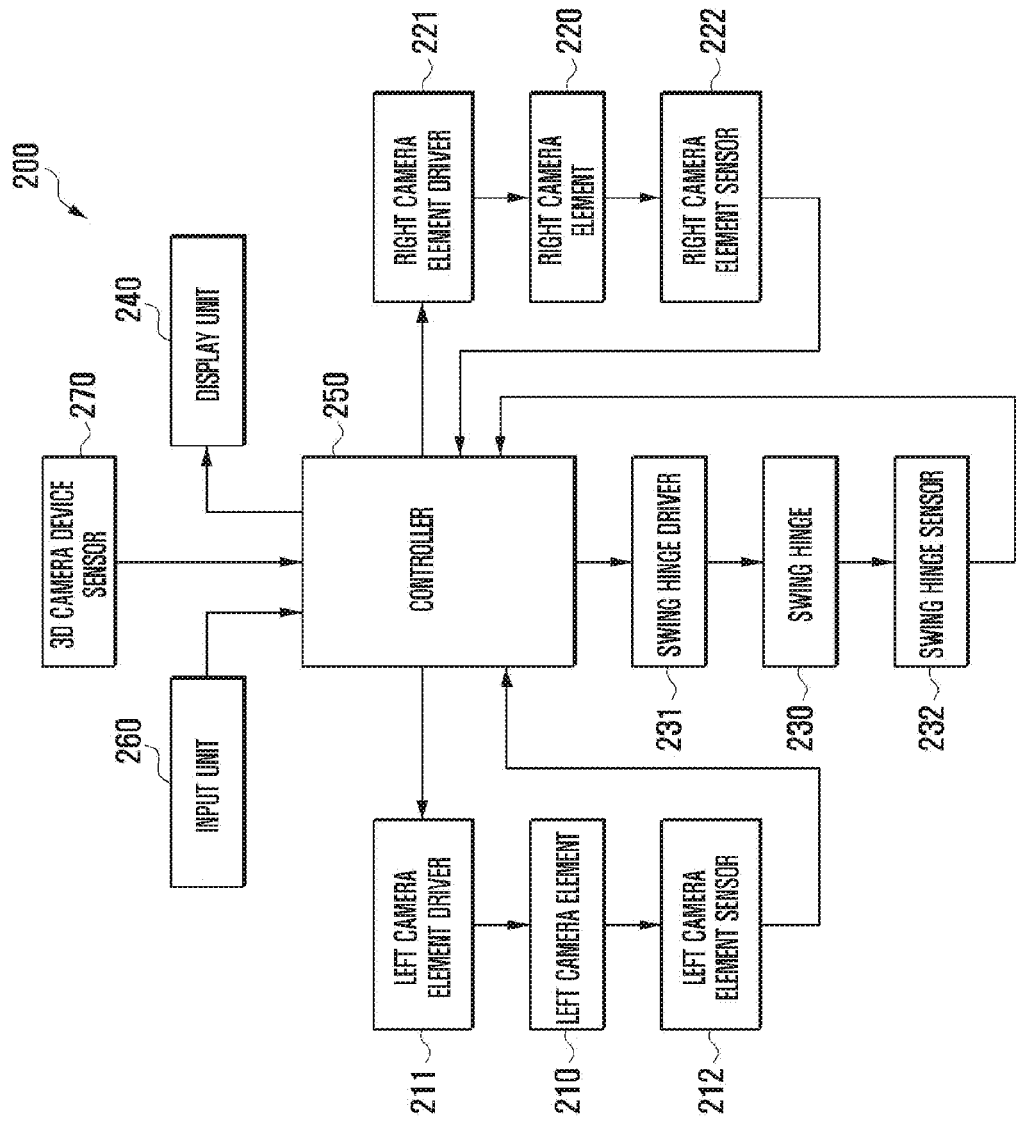
FIG. 3A is a block diagram illustrating a three dimensional camera device according to an exemplary embodiment of the present invention.
Figure 3B:
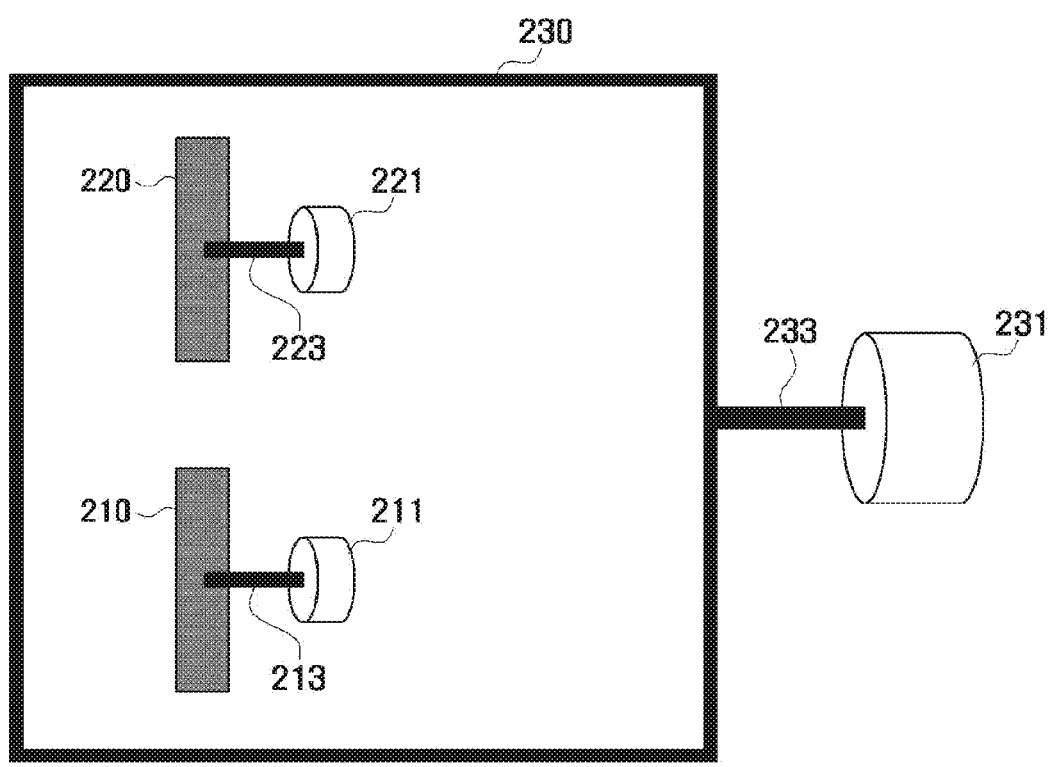
FIG. 3B is a view illustrating a swing hinge of the three dimensional camera device of FIG. 3A.
Figure 4:
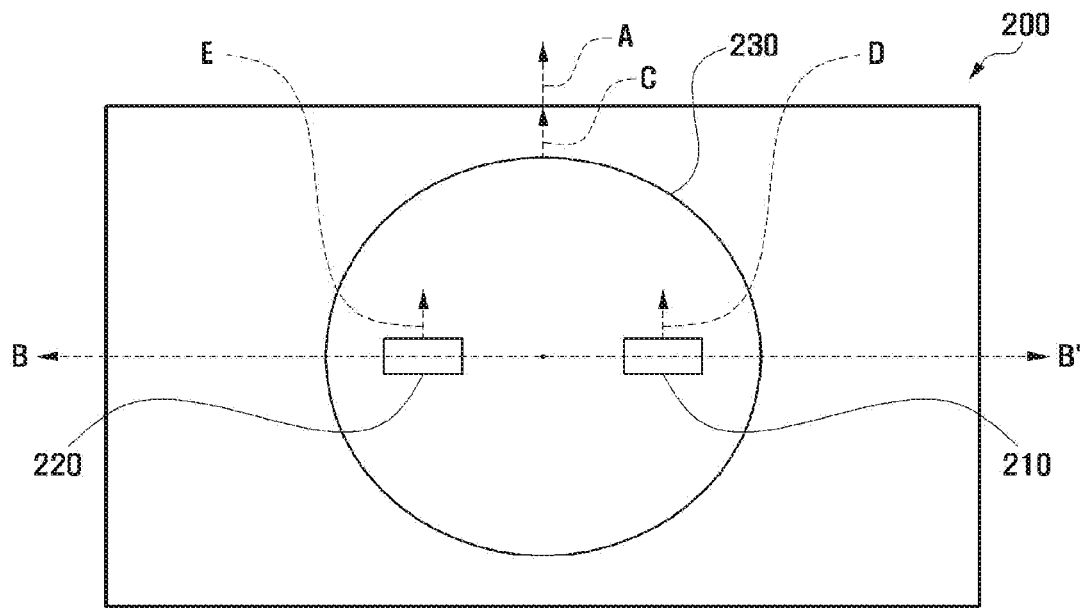
FIG. 4 is a front view of the three dimensional camera of FIG. 3A.
Figure 5:
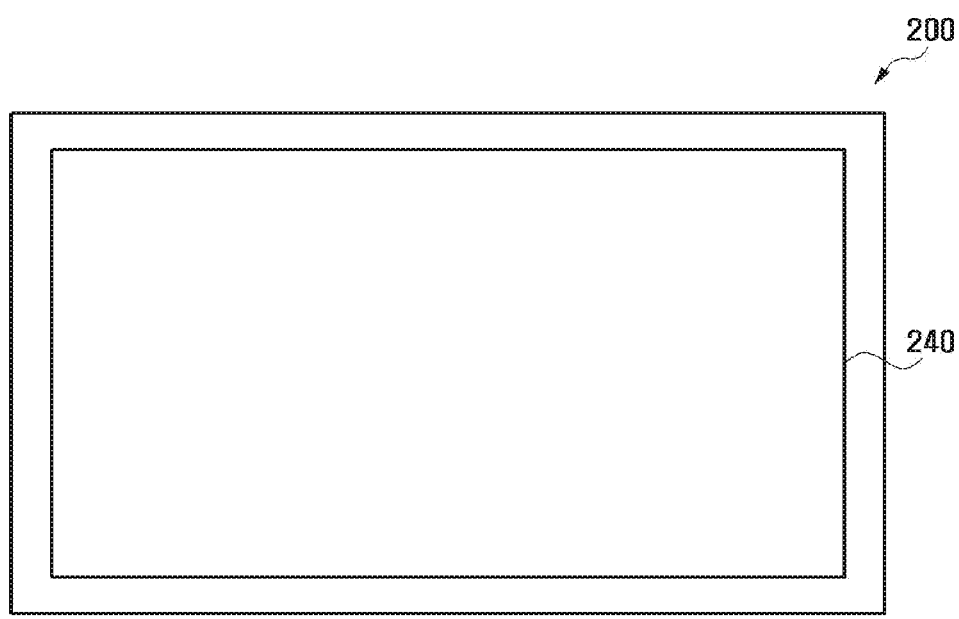
FIG. 5 is a rear view of the three dimensional camera device of FIG. 3A.

FIG. 3A is a block diagram illustrating a three dimensional camera device according to an exemplary embodiment of the present invention. FIG. 3B is a view illustrating a swing hinge of the three dimensional camera device of FIG. 3A. FIG. 4 is a front view of the three dimensional camera of FIG. 3A. FIG. 5 is a rear view of the three dimensional camera device of FIG. 3A.

For reference the term 'normal landscape pose' denotes a pose of the three dimensional camera device where a three dimensional image is normally displayed on a display unit in a reset state. The terms 'normal landscape pose' and the term 'landscape pose' may be interchangeably used herein. Moreover, the term 'reference direction' denotes a direction to which the three dimensional camera device and tops of respective devices thereof face when the three dimensional camera device is in the normal landscape pose.

Referring to FIGS. 3A to 5, a three dimensional camera device 200 according to an exemplary embodiment of the present invention includes a left camera element 210, a right camera element 220, a left camera element driver 211, a right camera element driver 221, a left camera element sensor 212, a right camera element sensor 222, a swing hinge 230, a swing hinge driver 231, a swing hinge sensor 232, a three dimensional camera device sensor 270, a display unit 240, an input unit 260, and a controller 250.

The left camera element 210 and a right camera element 220 are used to photograph an image for a left eye and an image for a right eye and are provided on the front side of the three dimensional camera device 200. The left camera element driver 211 rotates the left camera element 210 about the center of the left camera element 210 to align a reference direction D of the left camera element 210 to a reference direction A of the three dimensional camera device 200. The left camera element driver 211, as illustrated in FIG. 3B, is connected to the rear side of the left camera element 210 by a rotation shaft 213 and may be a motor. The right camera element driver 221 rotates the right camera element 220 about the center of the right camera element 220 to align a reference direction E of the right camera element 220 to the reference direction A of the three dimensional camera device 200, and is connected to the rear side of the right camera element 220 by a rotation shaft 223 as illustrated in FIG. 3B, and may be a motor. The left camera element sensor 212 and the right camera element sensor 222 sense the reference direction D of the left camera element 210 and the reference direction E of the right camera element 220 and may be acceleration sensors.

The swing hinge 230 rotates the left camera element 210 and the right camera element 220 about the mid-point between the left camera element 210 and the right camera element 220. In the swing hinge 230, the left camera element 210 and the right camera element 220 are arranged to face each other about the center of the swing hinge 230. The swing hinge may be cylindrical. The swing hinge driver 231 rotates the swing hinge 230 about the center of the swing hinge 230 to maintain the transversal direction (i.e., a direction of a line passing from the center of the left camera element 210 to the center of the right camera element 220; B-B') of the swing hinge 230 to be horizontal, and is connected to the rear side of the swing hinge driver 231 by the rotation shaft 233 as illustrated in FIG. 3B. The swing hinge driver 231 may be a motor. The swing hinge sensor 232 senses the transversal direction and a reference direction C of the swing hinge 230 and may be an acceleration sensor.

The three dimensional camera device sensor 270 senses the reference direction A of the three dimensional camera device 200 and may be an acceleration sensor.

The display unit 240 displays an image for a left eye and an image for a right eye that are photographed respectively by the left camera element 210 and the right camera element 220 to provide a three dimensional image to a user. The input unit 260 is for a user to input a desired item into the three dimensional camera device 200 and may be a touch screen, a touch key, or a button key.

The controller 250 receives and determines input signals, image signals, and sensing signals from the respective elements and transmits control signals to the respective elements.

According to the three dimensional camera device of the present exemplary embodiment, since the left camera element 210 and the right camera element 220 may be arranged horizontally by the swing hinge 230, a user may photograph a three dimensional image freely in a usual manner or do so regardless of motion patterns. Moreover, since the reference direction D of the left camera element 210 and the reference direction E of the right camera element 220 are aligned with the reference direction A of the three dimensional camera device 200 by the left camera element driver 211 and the right camera element driver 221, a subject may be displayed on the display unit 240 in the same direction as the subject is posed.

A method of controlling the three dimensional camera device 200 according to an exemplary embodiment of the present invention will be described below with reference to FIGS. 3A, 4, and 6.

Figure 6:
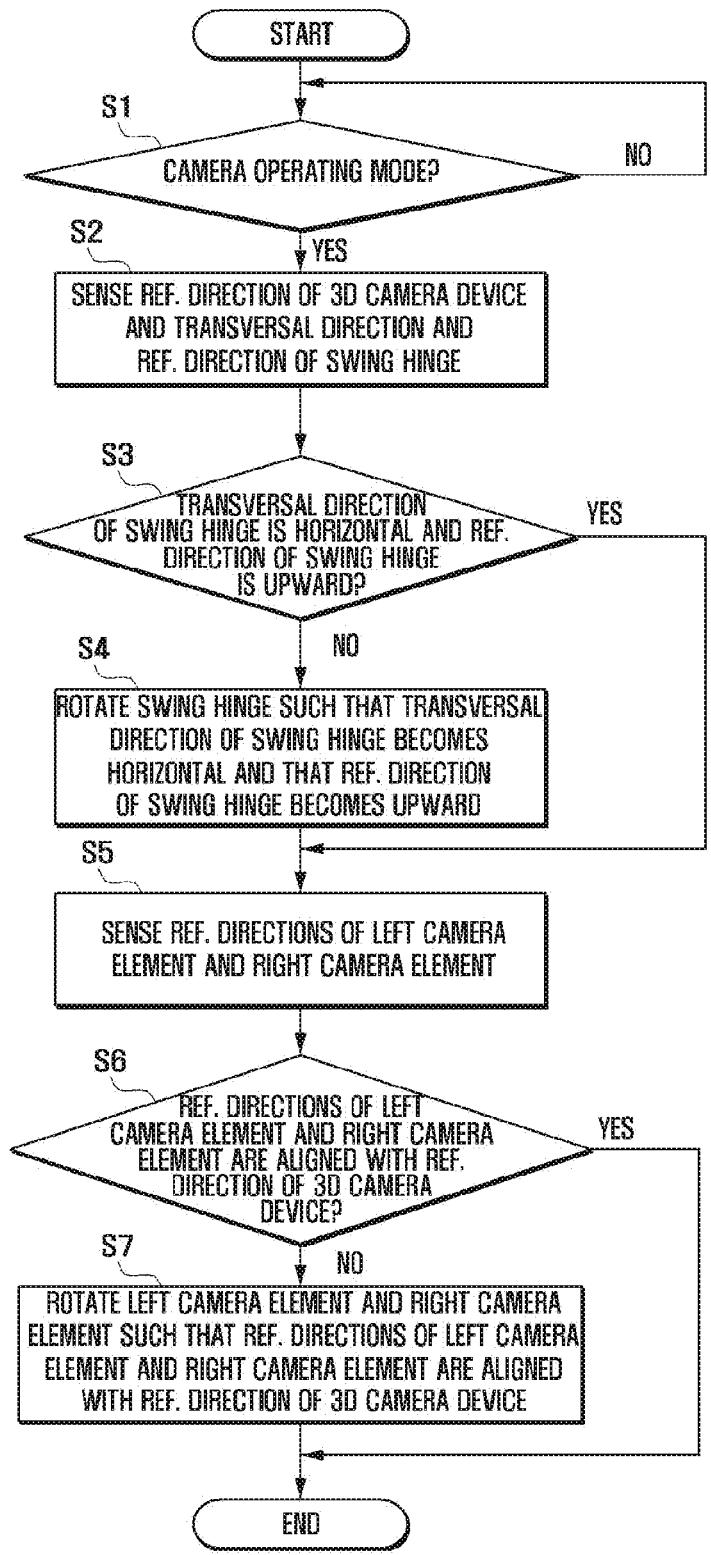
FIG. 6 is a flowchart illustrating a method of controlling a three dimensional camera device according to an exemplary embodiment of the present invention.

FIG. 6 is a flowchart illustrating a method of controlling a three dimensional camera device according to an exemplary embodiment of the present invention.

Referring to FIGS. 3A, 4, and 6, in step S1, the controller 250 determines whether the three dimensional camera device 200 is in a camera operation mode. In the camera operating mode, the camera elements perform a photographing operation and the camera operation mode includes a preview mode (i.e., a state of performing photographing before the camera elements photograph an image) or a moving picture photographing mode. In step S1, when the three dimensional camera device is not in the camera operating mode, the controller 250 repeats step S1 and again determines whether the three dimensional camera device 200 is in the camera operating mode. In step S1, when the three dimensional camera device is in the camera operating mode, the three dimensional camera device sensor 270 senses a reference direction of the three dimensional camera device 200 and the swing hinge sensor 232 senses the transversal direction (B-B') and the reference direction D of the swing hinge 230 in step S2.

In step S3, the controller 250 determines whether the transversal direction B-B' of the swing hinge 240 sensed in step S2 is a horizontal direction and whether the reference direction D of the swing hinge 230 is an upward direction. When the transversal direction B-B' of the swing hinge 230 and the reference direction C of the swing hinge 230 is the upward direction in step S3, the reference direction D of the left camera element 210 and the reference direction E of right camera element 220 are sensed in step S5. When the transversal direction B-B' of the swing hinge 230 is not the horizontal direction or when the reference direction C of the swing hinge 230 is not the upward direction in step S3, the swing hinge 230 is rotated such that the transversal direction B-B' of the swing hinge 230 becomes the horizontal direction and that the reference direction C of the swing hinge 230 becomes the upward direction in step S4.

After the swing hinge 230 is rotated in step S4, left camera element sensor 212 senses the reference direction of the left camera element 210 and the right camera element sensor 222 senses the reference direction E of the right camera element 220 in step S5. In step S6, the controller 250 determines whether the reference direction D of the left camera element 210 and the reference direction of the right camera element 220 that are sensed in step S5 are aligned with the reference direction A of the three dimensional camera device 200 in step S6. When the reference direction D of the left camera element 210 and the reference direction E of the right camera element 220 are aligned with the reference direction A of the three dimensional camera device 200 in step S6, the method of controlling a three dimensional camera device is ended. When the reference direction D of the left camera element 210 and the reference direction E of the right camera element 220 are not aligned with the reference direction A of the three dimensional camera device 200 in step S6, the left camera element 210 and the right camera element 220 are rotated such that the reference direction D of the left camera element 210 and the reference direction of the right camera element 220 are aligned with the reference direction A of the three dimensional camera device 200 in step S7.

The method of controlling the three dimensional camera device 200 of FIG. 6 will be described below with reference to FIGS. 3A, and 8A to 8C. For reference, a rotating direction is clockwise when viewing from the front side and a description of some steps as illustrated in FIG. 6 will be omitted.

Figure 8A:
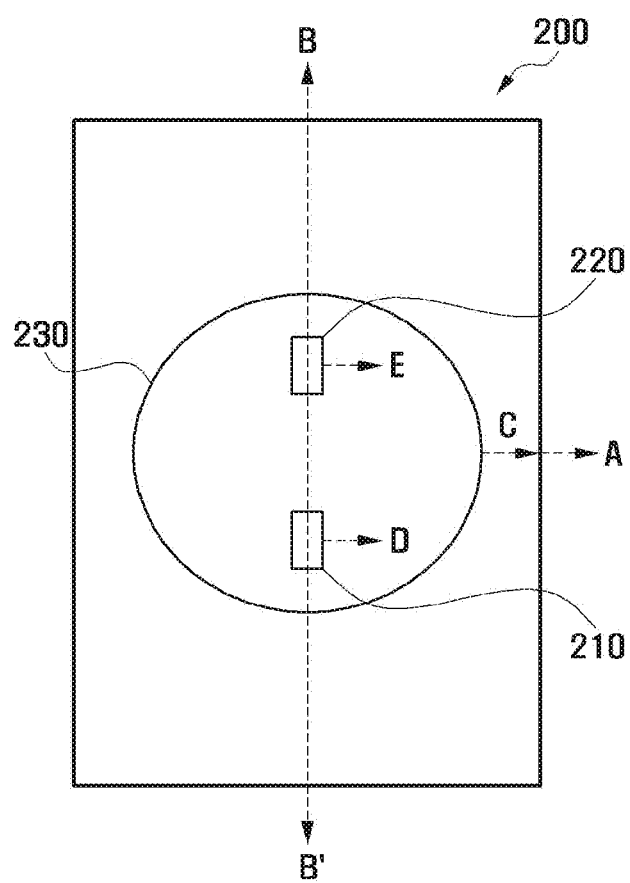
FIGS. 8A to 8C are views illustrating the method of controlling the three dimensional camera device of FIG. 6.
Figure 8B:
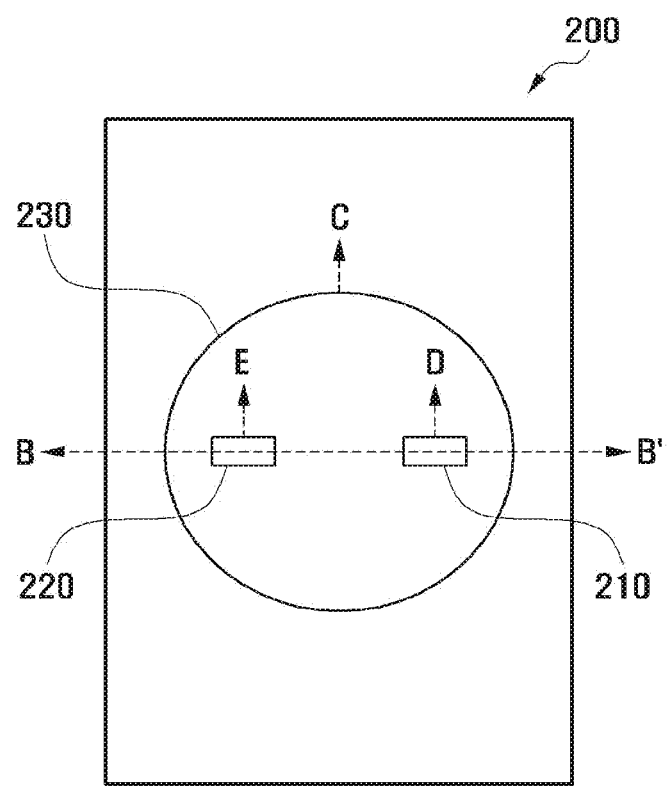
Figure 8C:
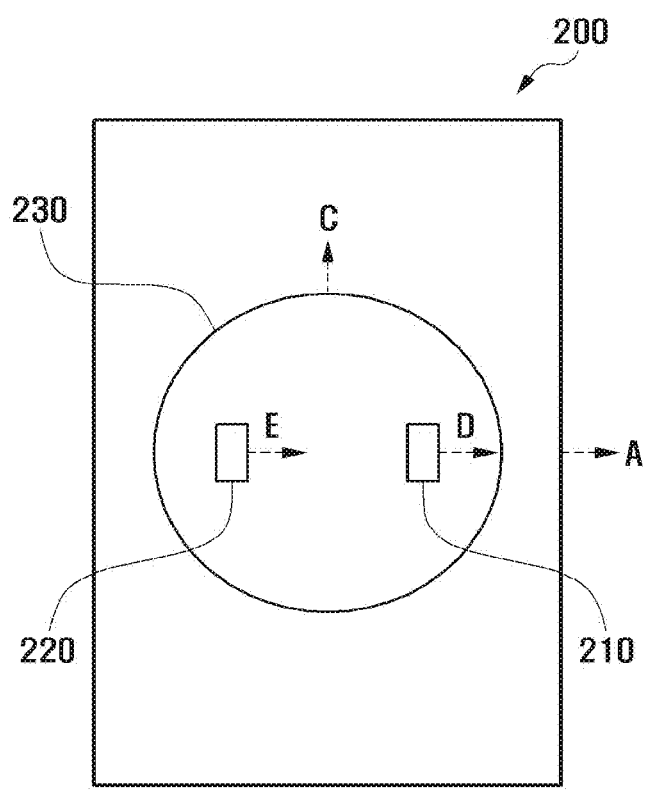

FIGS. 8A to 8C are views illustrating the method of controlling a three dimensional camera device of FIG. 6.

Referring to FIGS. 3A, 6 and 8A to 8C, it is assumed in FIG. 8A that the three dimensional camera device 200 is rotated by X degrees (=90 degrees) from a normal landscape pose. Then, the controller 250 determines that the transversal direction B-B' of the swing hinge 230 is not horizontal in step S3 and the swing hinge driver 231 rotates the swing hinge 230 by −X degrees (=−90 degrees) such that the transversal direction B-B' of the swing hinge 230 is horizontal and that the reference direction C of the swing hinge 230 is the upward direction as illustrated in FIG. 8B in step S4. The reference direction D of the left camera element 210 and the reference direction E of the right camera element 220 after the rotation in step S4 are sensed in step S5. The controller 250 determines that the reference direction D of the left camera element 210 and the reference direction E of the right camera element 220 sensed in step S5 are different from the reference direction A of the three dimensional camera device 200 in step S6, and the left camera element driver 211 and the right camera element driver 221 rotate the left camera element 210 and the right camera element 220 by X degrees (=90 degrees) respectively, as illustrated in FIG. 8C, such that the reference direction D of the left camera element 210 and the reference direction E of the right camera element 220 are aligned with the reference direction A of the three dimensional camera device 200 in step S7.

According to the present exemplary embodiment, since the left camera element driver 211 and the right camera element driver 221 control the left camera element 210 and the right camera element 220 in such a manner so as to rotate the left camera element 210 and the right camera element 220 by X degrees after the swing hinge driver 231 rotates the swing hinge 230 by −X degrees regardless of a range of the rotation angle X degrees of the three dimensional camera device 200, the controlling method is simple and complexity of software is low.

Another method of controlling the three dimensional camera device 200 according to an exemplary embodiment of the present invention will be described below with reference to FIGS. 3A, 4, and 7.

Figure 7:
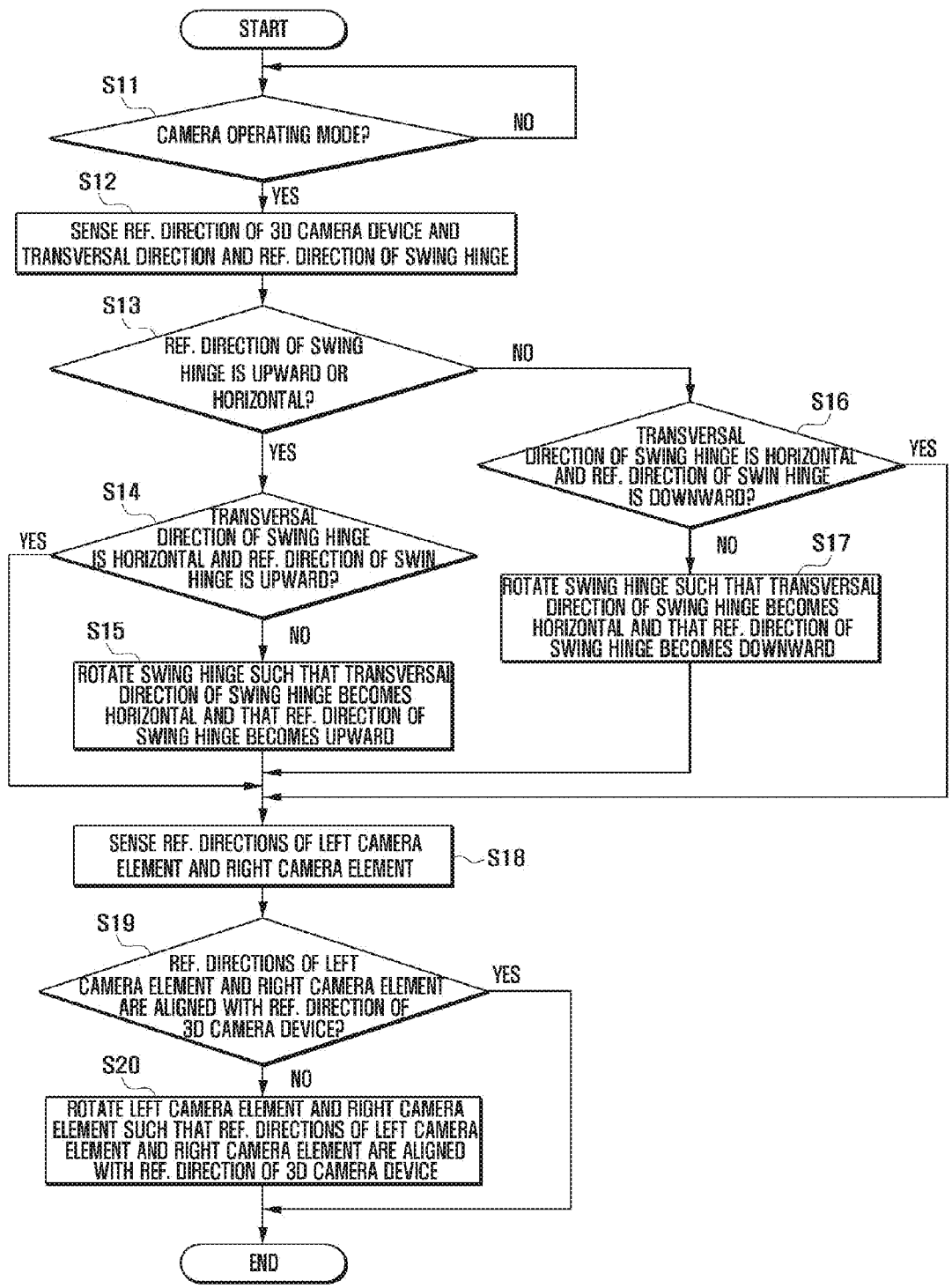
FIG. 7 is a flowchart illustrating a method of controlling a three dimensional camera device according to another exemplary embodiment of the present invention.

FIG. 7 is a flowchart illustrating a method of controlling a three dimensional camera device according to another exemplary embodiment of the present invention.

Referring to FIGS. 3A, 4, and 7, in step S11, the controller 250 determines whether the three dimensional camera device is in a camera operating mode. When the three dimensional camera device is not in the camera operating mode in step S11, the controller 250 repeats step S11 and again determines whether the three dimensional camera device 200 is in the camera operating mode. When the controller 250 determines that the three dimensional camera device 200 is in the camera operating mode in step S11, three dimensional camera device sensor 270 senses a reference direction A of the three dimensional camera device 200 and the swing hinge sensor 232 senses the transversal direction B-B' and the reference direction C of the swing hinge 230 in step S12.

The controller 250 determines whether the reference direction A of the three dimensional camera device 200 sensed in step S12 is the upward direction or the horizontal direction in step S13. When the controller 250 determines that the reference direction A of the three dimensional camera device 200 is the upward direction or the horizontal direction in step S13, the controller 250 determines whether the transversal direction B-B' of the swing hinge 230 is the horizontal direction and whether the reference direction C of the swing hinge 230 is the upward direction in step S14. When the transversal direction B-B' of the swing hinge 230 and the reference direction C of the swing hinge 230 is the upward direction in step S14, the left camera element sensor 212 senses the reference direction D of the left camera element 210 and the right camera element sensor 221 senses the reference direction E of the right camera element 220 in step S18. When the transversal direction B-B' of the swing hinge 230 is not horizontal or when the reference direction C of the swing hinge 230 is not the upward direction in step S14, the swing hinge driver 231 rotates the swing hinge 230 such that the transversal direction B-B' of the swing hinge 230 becomes the horizontal direction and that the reference direction C of the swing hinge 230 becomes the upward direction in step S15.

When the reference direction A of the three dimensional camera device 200 faces the downward direction in step S13, the controller 250 determines whether the transversal direction B-B' of the swing hinge 230 is the horizontal direction and whether the reference direction C of the swing hinge 230 is the downward direction in step S16. When the transversal direction B-B' of the swing hinge 230 is the horizontal direction and the reference direction C of the swing hinge 230 is the downward direction in step S16, the left camera element sensor 212 senses the reference direction D of the left camera element 210 and the right camera element sensor 221 senses the reference direction E of the right camera element 220 in step S18. When the transversal direction B-B' of the swing hinge 230 is not the horizontal direction and when the reference direction C of the swing hinge 230 is not the downward direction in step S16, the swing hinge driver 231 rotates the swing hinge 230 such that the transversal direction B-B' becomes the horizontal direction and that the reference direction C of the swing hinge 230 becomes the downward direction in step S17.

After the rotation of the swing hinge 230 in steps S15 and S17, the left camera element sensor 212 senses the reference direction D of the left camera element 210 and the right camera element sensor 221 senses the reference direction E of the right camera element 220 in step S18. The controller 250 determines whether the reference direction D of the left camera element 210 and the reference direction E of the right camera element 220 that are sensed in step S18 are aligned with the reference direction A of the three dimensional camera device 200 in step S19. When the reference direction D of the left camera element 210 and the reference direction D of the right camera element 220 are aligned with the reference direction A of the three dimensional camera device 200 in step S19, the method of controlling a three dimensional camera device is ended. When the reference direction D of the left camera element 210 and the reference direction D of the right camera element 220 are not aligned with the reference direction A of the three dimensional camera device 200 in step S19, the left camera element driver 211 and the right camera element driver 221 rotate the left camera element 210 and the right camera element 220 such that the reference direction D of the left camera element 210 and the reference direction E of the right camera element 220 are aligned with the reference direction A of the three dimensional camera device 200 in step S20.

The method of controlling the three dimensional camera device 200 of FIG. 7 will be described below with reference to FIGS. 3A, and 9A to 12C. For reference, it is assumed that the rotating direction is clockwise when viewing from the front side and a description of some steps in FIG. 7 will be omitted.

FIGS. 9A to 12C are views illustrating the method of controlling the three dimensional camera device of FIG. 7.

Figure 9A:
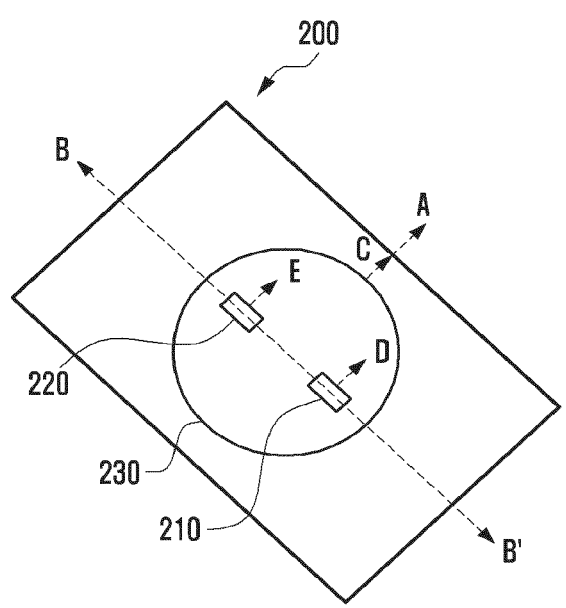
FIGS. 9A to 12C are views illustrating the method of controlling the three dimensional camera device of FIG. 7.
Figure 9B:
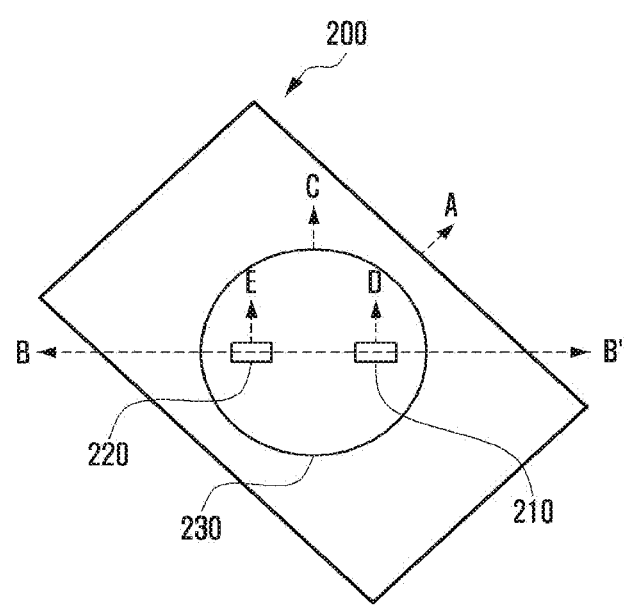
Figure 9C:
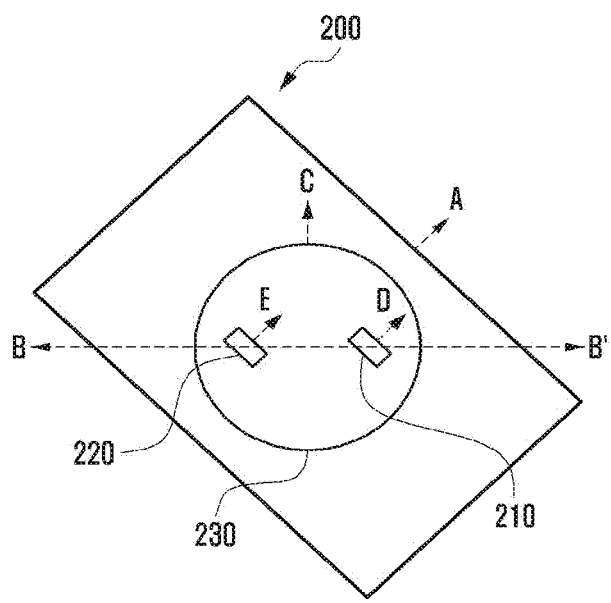
Figure 12A:
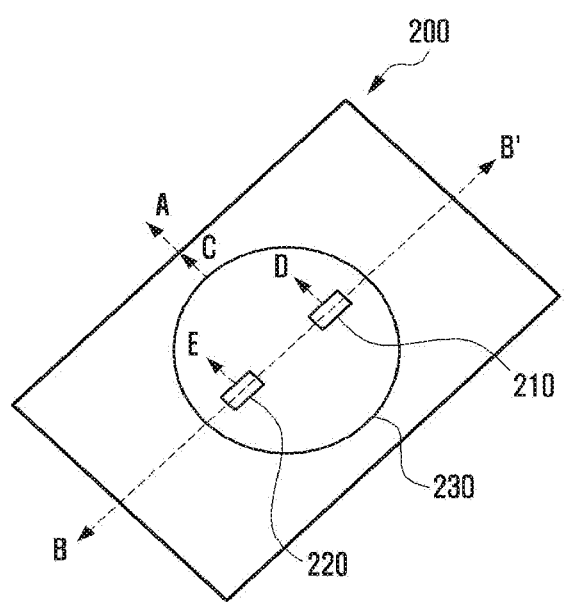
Figure 12B:
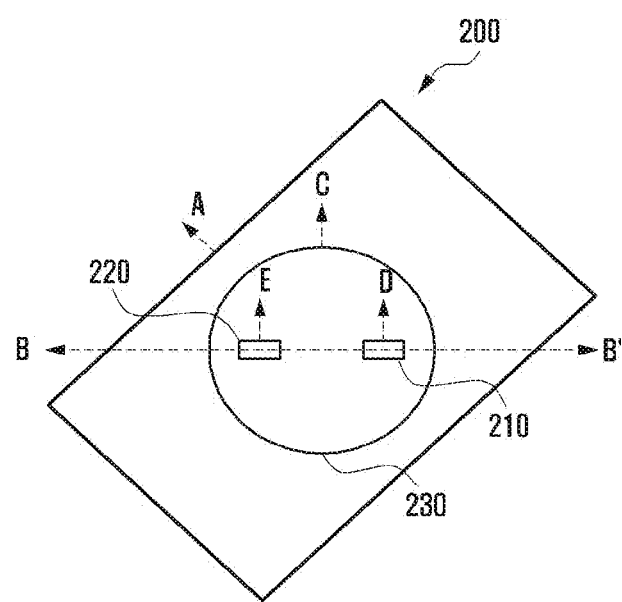
Figure 12C:
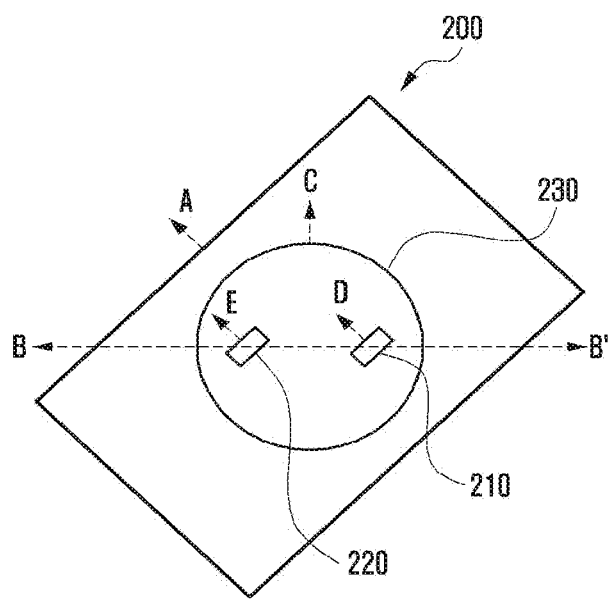

Referring to FIGS. 3A, 7, 9A to 9B, and 12A to 12C, it is assumed that in FIGS. 9A and 12A that the three dimensional camera device 200 is rotated by a range of 0 degree<X degrees (=45 degrees)<=90 degrees or −90 degrees<=X degrees (=−45 degrees)<0 degree from the normal landscape pose. Then, the controller 250 determines that the reference direction A of the three dimensional camera device 200 is the upward direction in step S13 and that the transversal direction B-B' of the swing hinge 230 is not the horizontal direction in step S14, and swing hinge driver 231 rotates the swing hinge 230 by −X degrees such that the transversal direction B-B' of the swing hinge 230 becomes the horizontal direction and that the reference direction C of the swing hinge 230 becomes the upward direction as illustrated in FIGS. 9B and 12B in step S15. When the reference direction D of the right camera element 210 and the reference direction E of the right camera element 220 are sensed after the rotation of the swing hinge 230 in step S15 in step S18, the controller 250 determines that the reference direction D of the left camera element 210 and the reference direction E of the right camera element 220 are different from the reference direction A of the three dimensional camera device 200 in step S19. Based on the determination in step S19, the left camera element driver 211 and the right camera element driver 221 rotate the left camera element 210 and the right camera element 220 by X degrees respectively, as illustrated in FIGS. 9C and 12C, such that the reference direction D of the left camera element 210 and the reference direction E of the right camera element 220 are aligned with the reference direction A of the three dimensional camera device 200 in step S20.

Figure 10A:
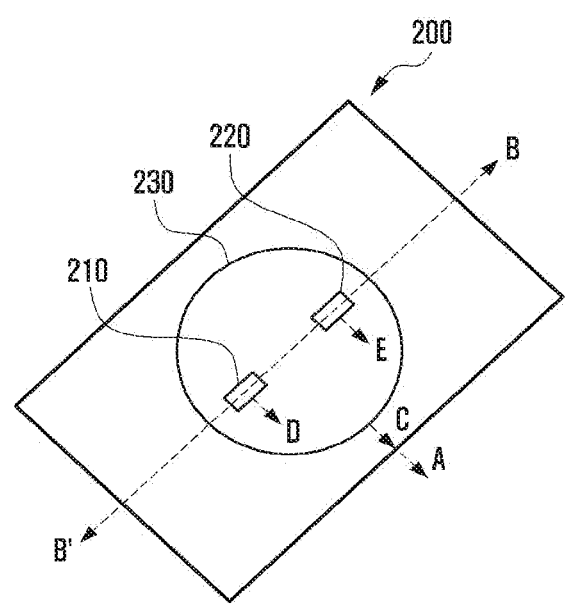
Figure 10B:
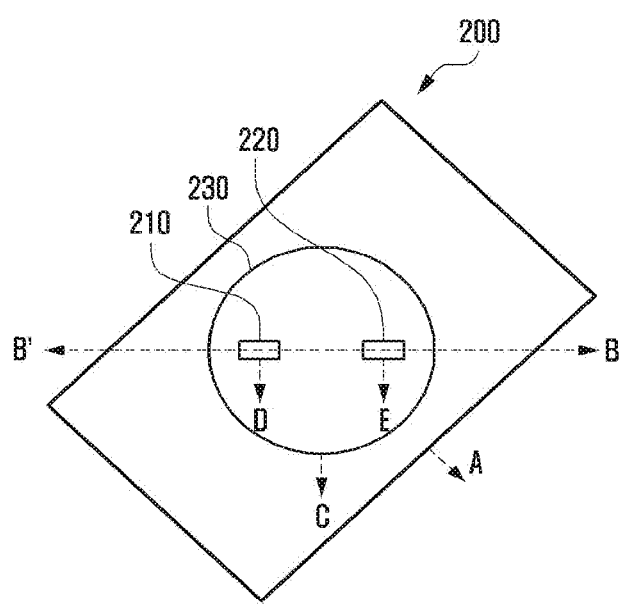
Figure 10C:
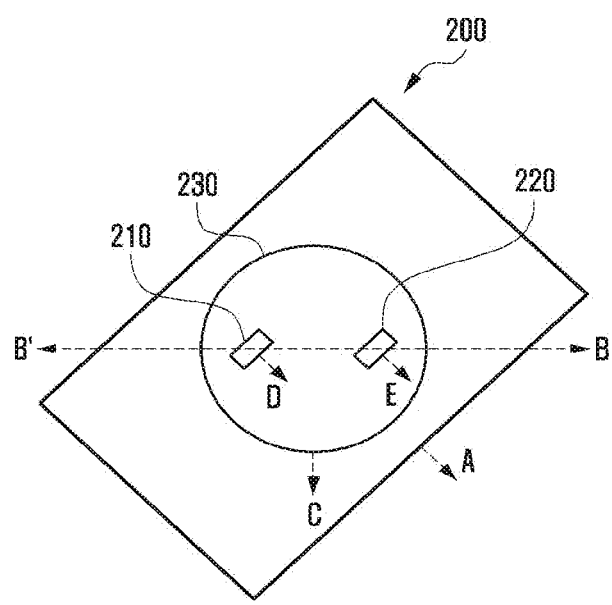
Figure 11A:
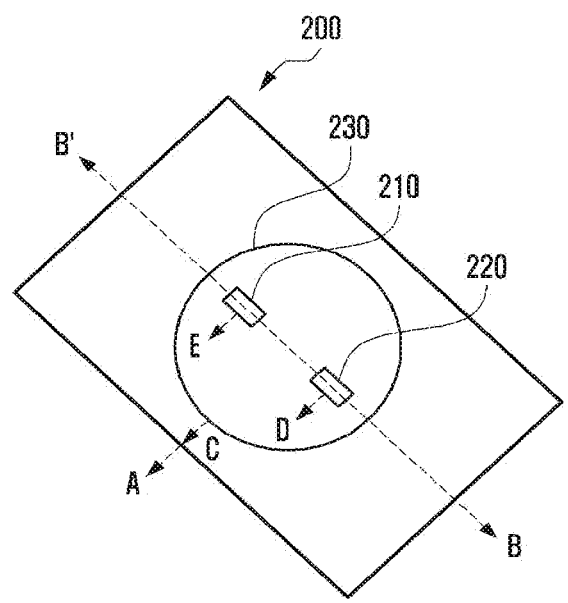
Figure 11B:
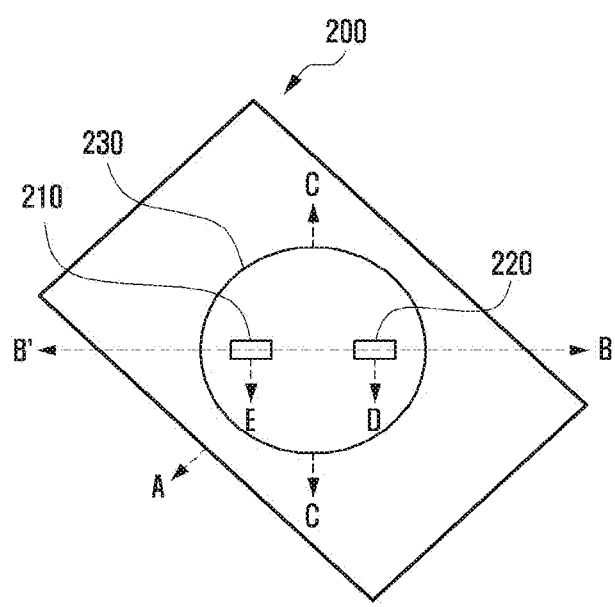
Figure 11C:
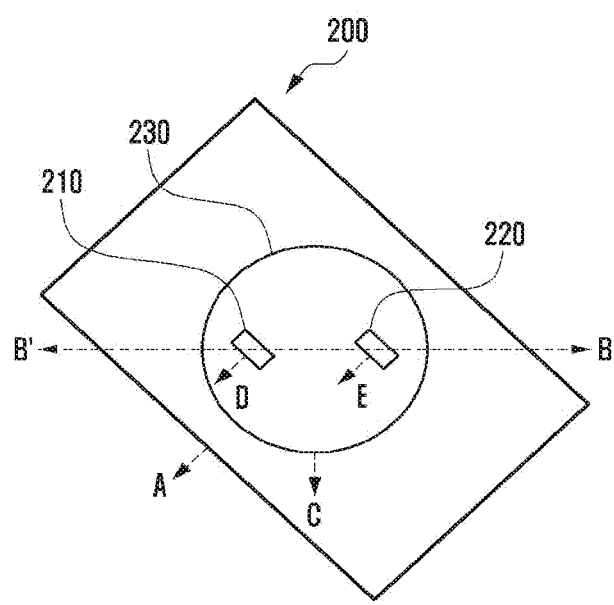

Referring to FIGS. 3A, 7, 10A to 10B, and 11A to 11C, it is assumed in FIGS. 10A and 11A that the three dimensional camera device 200 is rotated by a range of 90 degrees<X degrees (=135 degrees)<180 degrees or 180 degrees<=X degrees (=225 degrees)<270 degrees from the normal landscape pose. Then, the controller 250 determines that the reference direction A of the three dimensional camera device 200 is the downward direction in step S13 and that the transversal direction B-B' of the swing hinge 230 is not the horizontal direction in step S16. In step S17, as illustrated in FIGS. 10B and 11B, the swing hinge driver 231 rotates the swing hinge 230 by (180−X) degrees such that the transversal direction B-B' of the swing hinge 230 becomes the horizontal direction and that the reference direction C of the swing hinge 230 becomes the downward direction. When the reference directions of the left camera element and the right camera element are sensed after the rotation of the swing hinge 230 in step S17 in step S18, the controller 250 determines that the reference direction D of the left camera element 210 and the reference direction E of the right camera element 220 are different from the reference direction A of the three dimensional camera device 200 in step S19. According to the determination in step S19, as illustrated in FIGS. 10C and 11C, the left camera element driver 211 and the right camera element driver 221 rotate the left camera element 210 and the right camera element 220 by (X−180) degrees such that the reference direction D of the left camera element 210 and the reference direction E of the right camera element 220 are aligned with the reference direction A of the three dimensional camera device 200 in step S20.

According to the present exemplary embodiment, since the three dimensional camera device is controlled by dividing the range of the rotating angle X degree of the three dimensional camera device 200 into a partial range of −90 degrees<=X degrees<=90 degrees and a partial range of 90 degrees<X degrees<270 degrees, the rotating angle of the swing hinge 230 and the camera elements 210 and 220 is less than 180 degrees and mechanical complexity becomes low.

The exemplary embodiments of the present invention are provided for the easy description and understanding of the present invention with specific examples but do not limit the scope of the present invention. It will be appreciated by those skilled in the art that various changes and modifications may be practiced without departing from the spirit of the present invention.

What is claimed is:

1. A three dimensional camera device comprising:
   a left camera element;
   a right camera element;
   a swing hinge for rotating the left camera element and the right camera element about the mid-point between the left camera element and the right camera element;
   a left camera element driver for rotating the left camera element about a center of the left camera element; and
   a right camera element driver for rotating the right camera element about a center of the right camera element,
   wherein, when the rotating angle of the three dimensional camera devise is sensed, the swing hinge is rotated by the sensed angle of rotation in which the three dimensional camera is rotated, in a direction opposite to a direction in which the three dimensional camera device is rotated, and
   wherein the left camera element and the right camera element are rotated by the sensed angle in which the three dimensional camera device is rotated, in a same direction as the direction in which the three dimensional camera device is rotated.

2. The three dimensional camera device of claim 1, further comprising a swing hinge driver for rotating the swing hinge about a center of the swing hinge.

3. The three dimensional camera device of claim 2, wherein the swing hinge driver rotates the swing hinge such that a transversal direction of the swing hinge is a horizontal direction.

4. The three dimensional camera device of claim 3, wherein the transversal direction of the swing hinge is a direction of a line passing from a center of the left camera element to the center of the right camera element.

5. The three dimensional camera device of claim 1, wherein the left camera element driver rotates the left camera element such that a reference direction of the left camera element is aligned with a reference direction of the three dimensional camera device.

6. The three dimensional camera device of claim 5, wherein the reference direction of the left camera element is a direction to which a part corresponding to a top of the left camera element faces when the three dimensional camera device takes a landscape pose.

7. The three dimensional camera device of claim 5, wherein the reference direction of the three dimensional camera device is a direction to which a part corresponding to a top of the three dimensional camera device faces when the three dimensional camera device takes a landscape pose.

8. The three dimensional camera device of claim 1, wherein the right camera element driver rotates the right camera element such that a reference direction of the right camera element is aligned with a reference direction of the three dimensional camera device.

9. The three dimensional camera device of claim 8, wherein the reference direction of the right camera element is a direction to which a part corresponding to a top of the right camera element faces when the three dimensional camera device takes a landscape pose.

10. A method of controlling a three dimensional camera device, the method comprising:
    rotating a swing hinge, which rotates a left camera element and a right camera element about a mid-point between the left camera element and the right camera element, such that a transversal direction of the swing hinge is a horizontal direction;
    rotating the left camera element about a center of the left camera element; and
    rotating the right camera element about a center of the right camera element,
    wherein the left camera element and the right camera element are rotated such that a reference direction of the left camera element and a reference direction of the right camera element are aligned with a reference direction of the three dimensional camera device,
    wherein the rotating of the swing hinge comprises sensing an angle of rotation in which the three dimensional camera device is rotated, and rotating the swing hinge by the sensed angle of rotation in which the three dimensional camera device is rotated, in a direction opposite to a direction in which the three dimensional camera device is rotated, and
    wherein the rotating of the camera elements comprises rotating the left camera element and the right camera element by the sensed angle in which the three dimensional camera device is rotated, in a same direction as the direction in which the three dimensional camera device is rotated.

11. The method of claim 10, wherein the rotating of the swing hinge comprises:
    sensing an angle of rotation in which the three dimensional camera device is rotated;
    determining whether the sensed angle of rotation in which the three dimensional camera device is rotated is within a range of −90 degrees<=X degrees<=90 degrees;
    rotating the swing hinge by X degrees in a direction opposite to a direction in which the three dimensional camera device is rotated when the sensed angle of rotation is determined to be −90 degrees<=X degrees<=90 degrees; and
    rotating the swing hinge by an angle of (180−X) degrees in a same direction as the direction in which the three dimensional camera device is rotated in which the angle of rotation is determined to be 90 degrees<X degrees<270 degrees.

12. The method of claim 10, wherein the rotating of the camera elements comprising:
  rotating the left camera element and the right camera element by X degrees in the same direction as the direction in which the three dimensional camera device is rotated when the angle of rotation is determined to be −90 degrees<=X degrees<=90 degrees; and
  rotating the left camera element and the right camera element by an angle of (180−X) degrees in the same direction opposite to the direction in which the three dimensional camera device is rotated when the angle of rotation is determined to be 90 degrees<X degrees<270 degrees.

13. The method of claim 10, wherein the rotating of the swing hinge comprising:
  sensing the reference direction of the three dimensional camera device and the transversal direction and a reference direction of the swing hinge;
  determining whether the transversal direction of the swing hinge is the horizontal direction and whether the reference direction of the swing hinge is an upward direction; and
  rotating the swing hinge such that the transversal direction becomes the horizontal direction and the reference direction of the swing hinge becomes the upward direction when the transversal direction is determined not to be the horizontal direction and when the reference direction of the swing hinge is determined not be the upward direction.

14. The method of claim 10, wherein the rotating of the swing hinge comprises:
  sensing the reference direction of the three dimensional camera device, the transversal direction and the reference direction of the swing hinge; and
  determining whether the reference direction of the three dimensional camera device is the upward direction or the horizontal direction.

15. The method of claim 14, wherein the rotating of the swing hinge comprises:
  determining whether the transversal direction of the swing hinge is the horizontal direction and whether the reference direction of the swing hinge is an upward direction when the reference direction of the three dimensional camera device is determined to be the upward direction or the horizontal direction; and
  rotating the swing hinge such that the transversal direction of the swing hinge becomes the horizontal direction and that the reference direction of the swing hinge becomes the upward direction when the transversal direction of the swing hinge is determined not to be the horizontal direction and when the reference direction of the swing hinge is determined not to be the upward direction.

16. The method of claim 14, wherein the rotating of the swing hinge comprises:
  determining whether the transversal direction of the swing hinge is the horizontal direction and whether the reference direction of the swing hinge is a downward direction when the reference direction of the three dimensional camera device is determined to be the downward direction; and
  rotating the swing hinge such that the transversal direction of the swing hinge becomes the horizontal direction and that the reference direction of the swing hinge becomes the downward direction when the transversal direction of the swing hinge is determined not to be the horizontal direction and when the reference direction of the swing hinge is determined not the downward direction.

* * * * *